United States Patent
Ooue et al.

[11] 3,755,677
[45] Aug. 28, 1973

[54] HOLOGRAM PHOTOGRAPHING APPARATUS WITH LIGHT MEASURING DEVICE

[75] Inventors: Shingo Ooue; Masakazu Hashiue; Masaru Noguchi, all of Asaka-shi, Saitama; Masane Suzuki, Omiya-shi, Saitama; Motonori Kanaya; Sakuo Kitahara, both of Asaka-shi, Saitama, all of Japan

[73] Assignees: Fuji Photo Film Co., Ltd., Kanagawa; Fuji Shashin Koki Kabushiki Kaisha, Saitama, both of Japan

[22] Filed: Feb. 11, 1972

[21] Appl. No.: 225,497

[30] Foreign Application Priority Data
Feb. 12, 1971 Japan.................... 46/5592

[52] U.S. Cl.................................. 250/204, 350/3.5
[51] Int. Cl........................ G02b 27/00, G01j 1/36
[58] Field of Search...................... 350/3.5; 250/201, 250/204, 205; 95/10 R, 10 CT; 356/106 R

[56] References Cited
UNITED STATES PATENTS
3,353,462  11/1967  Suzuki ........................ 95/10
3,572,882  3/1971  Neumann .......................... 350/3.5

OTHER PUBLICATIONS
Friesem et al.; 6 "Applied Optics" 851 (5/1967)
Kaspar et al., 58 "Journal Optic Society Am" 970 (7/1968)

Primary Examiner—David Schonberg
Assistant Examiner—Ronald J. Stern
Attorney—Richard C. Sughrue, John H. Mion et al.

[57] ABSTRACT

In a hologram photographing apparatus wherein the light from the source is divided into two beams, one of which is projected on the object to be photographed to obtain the object light beam, the other of which is caused to project directly on the photo-sensitive material to obtain the reference light beam, whereby both light are superimposed to record the interference fringe patterns; a photo-receiver is arranged so as to make it possible to measure the intensity ratio between the object light beam and the reference light beam as well as the quantity of exposure; and an incident light selecting member, which causes the object light beam or the reference light beam selectively to impinge onto said photo-receiver, is arranged in the light beam path in which the object light beam and the reference light exist at the same time.

6 Claims, 11 Drawing Figures

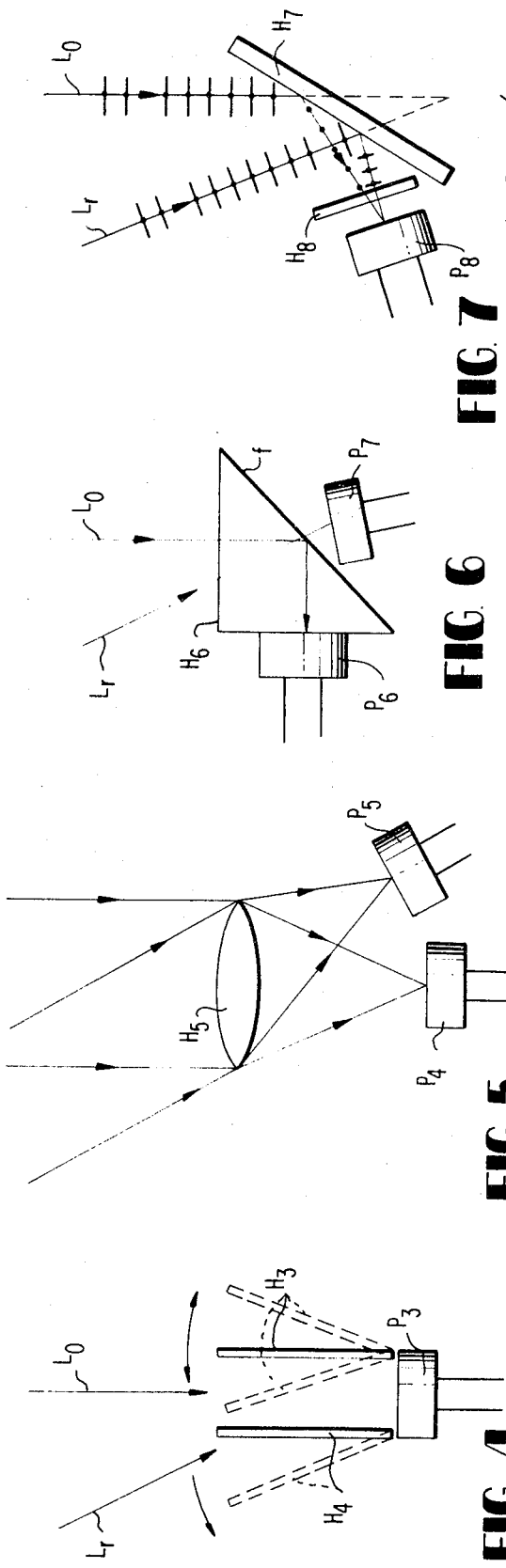

HOLOGRAM PHOTOGRAPHING APPARATUS WITH LIGHT MEASURING DEVICE

BACKGROUND OF THE INVENTION

Field of the Invention

The present invention relates to a hologram photographing apparatus, and more particularly to the hologram photographing apparatus equipped with light measuring device for measuring intensities of object light and reference light or quantity of light exposure to be given on the photo-sensitive material.

In the holography, the object light is, in general, formed by projecting a light from a point source which has an extremely high brightness and coherence such as a laser light, causing to interfere the object light and the reference light which are derived directly from the light source, recording the interference fringe patterns on a photo-sensitive material such as dry plates or films so as to form a hologram, and after predetermined developing treatment, to obtain an information by regenerating the hologram using above-said light source. The systems such as Fresnel hologram, Fraunhofer hologram are known.

On the hologram is recorded informations about the amplitude and phase of the wave form of the object light on the photo-sensitive material in a fringe pattern. While the usual information recording means, such as photographs using conventional incoherent light source and image focusing system, are those which record only the amplitude of wave form of the object light, which gives only a two-dimensional information, it has a great advantage that it is possible to record and regenerate a three-dimensional information of an object on photo-sensitive material. Furthermore, in recording of the interference fringe patterns, it is also advantageous that several images can be recorded in multiplex form by changing the direction.

In such a holography, the recording of the picture-image information is carried out in a form of interference fringe patterns, so that the quality of picture of the hologram-regenerated image is determined by the nature of the interference infringe patterns, which is largely influenced by variety of factors such as the characteristics of photo-sensitive material used, intensity ratio between the object light projected on the photo-sensitive material and the reference light, time of exposure, etc.

Now, considering on the intensity ratio between the object light and the reference light and on the time of exposure, when the complex amplitudes of object light entering on the photo-sensitive material and on the reference light are expressed, respectively:

$$O(x,y) = o(x, y) \, exp\{ i\phi(x, y) \},$$

$$R(x,y) = r(x, y) \, exp\{ i\phi(x,y) \},$$

the intensity of light $I(x, y)$ on the photo-sensitive material becomes $$I(x, y) = /R(x + y) + O(x, y)/^2$$
$$= \{r(x + y)\}^2 + \{o(x, y)\}^2 + 2r(x, y) o(x, y) \cos\{4(x, y) - \phi(x, y)\},$$

and the first and the second terms of the last equation express intensities of two lights, and the third term shows the changes of so-called contrast and the interval of the interference fringe patterns. Accordingly, if the sum of the first and the second items be made a constant, the exposure time is determined thereby, and the contrast of the interference fringe patterns is determined by the intensity ratio between the object light and the reference light. This ratio can be 1 : 2 to 1 : 7 experimentally, but it may change according to various conditions, so that it is preferable to provide a device on the hologram photographing apparatus for adjusting the intensity ratio appropriately at the photographing.

As for the device for measuring the intensities of the object light and the reference light, it is known to arrange photo-receivers in the light paths of the object light and reference light respectively in the hologram photographing apparatus, measuring and indicating the ratio between them, and causing adjustment of a photo-quantity adjusting member, such as an ND filter, arranged in said light paths for setting a required intensity ratio or to measure the quantity of exposure by simultaneously receiving the object light and the reference light at one of said photo-receivers.

Heretofore, in such a device the photo-receiver for object light is arranged near the surface of the photo-sensitive material, the photo-receiver for reference light, which is also used for a shielding plate for the light flux, is arranged remote from the surface of the photo-sensitive material, and the photo-receivers are inserted respectively in the light paths, and since said photo-receiver for the reference light obstructs the reference light on the photo-sensitive material at that time, the object light alone enters on the photo-receiver for the object light. However, with such an arrangement of the photo-receivers, the intensity of the reference light measured is different from that on the surface of the photo-sensitive material, and is measuring for a portion of area which is considerably larger than the photo-receiver for object light as considered on the surface of the photo-sensitive material, so that the ratio threbetween does not show the intensity ratio between both lights as they are. In general, the intensity ratio between the object light and the reference light is preferably measured at substantially the same portion of the photo-sensitive material, with the above-stated conventional devices, this is impossible with the above-described conventional devices.

SUMMARY OF THE INVENTION

The object of the present invention is to provide a hologram photo-graphing apparatus provided with a light measuring device which is so constituted that light measurement can be effected equivalent to the object light and reference light actually impinging on the surface of the photo-sensitive material.

BRIEF DESCRIPTION OF THE DRAWINGS

FIGS. 4 through 10 are partial views respectively showing other embodiments of the light measuring device according to the present invention.

DESCRIPTION OF THE PREFERRED EMBODIMENT

The invention will now be described in detail for a number of embodimental examples shown in the appended drawings.

Figure 1:
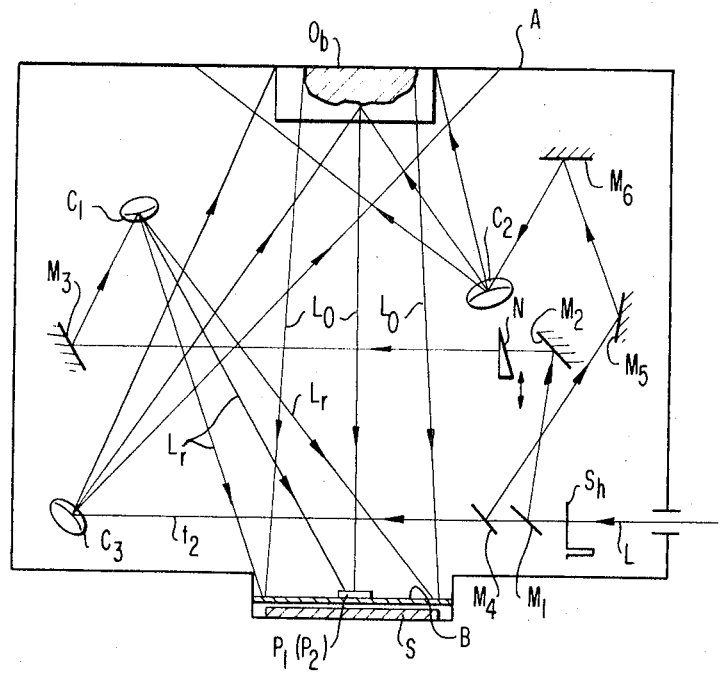
FIG. 1 is a schematic view of the constitution of the apparatus, according to the present invention.

FIG. 1 shows a representative form of a hologram photographing apparatus, which is so-called Fresnel hologram be adjusted. apparatus.

In FIG. 1, the housing A of the hologram photographing apparatus is provided with an optical system comprising: reflecting mirrors; etc.; a light beam L which is coherent and has a high brightness such as laser light beam source is transmitted and reflected by an appropriate translucent mirror $M_1$, for example; the reflected light, after being reflected by a reflecting mirror $M_2$ and passing through an appropriate light-quantity adjusting member N, is reflected further by a reflecting mirror $M_3$ and caused to impinge upon a spherical mirror $C_1$, and the reflected light is enlarged and is projected on the surface of the photo-sensitive material S as a reference light $L_r$. In this case, said light-quantity adjusting member N is made of an ND filter in a form of a wedge, or an iris of an area type having a larger number of small holes, and is made movable perpendicular to the light axis manually or automatically, whereby the intensity of the reference light $L_r$ can be adjusted. The light passing through the translucent mirror $M_1$ passes through and is reflected by the translucent mirror $M_4$, and the reflected light enters into a spherical mirror $C_2$ through reflecting mirror $M_5$, $M_6$, is enlarged thereby and illuminates the object $O_b$ to be photographed. The transmitted light $t_2$ also illuminates the object $O_b$ through a spherical mirror $C_3$, and the reflected light is projected on the surface of a photo-sensitive material S as an object light $L_o$. As is clear from the drawing, the reference light $L_r$ enters on the photo-sensitive material S with an inclination of $\theta$ relative to the object light $L_o$. As for the means for giving an exposure on the photosensitive material S, a shutter $S_h$ is provided just in front of the translucent mirror $M_1$, for example, and it is so constituted that it opens and closes for a predetermined exposing period determined by the light measuring device, of which the description will be given later.

Figure 2A:
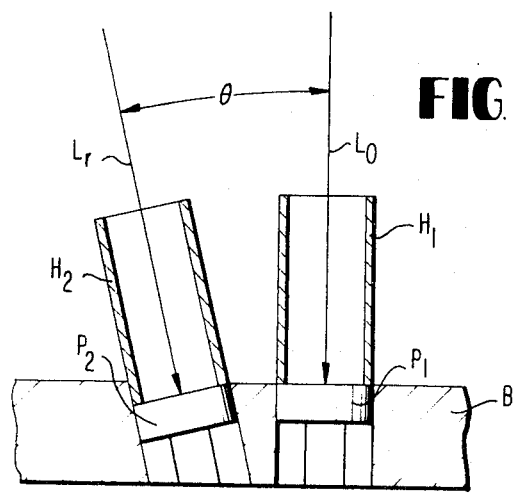
FIG. 2A is a partial view of an embodiment of the light measuring device used for the apparatus shown in FIG. 1.

The photosensitive material S is mounted in an accommodating chamber such as a detachable holder to the housing A as is known widely (not shown), and in front of the chamber, there is provided a light shielding plate B which is slidable or swingable against the housing A. Photo-receivers $P_1$ and $P_2$ are mounted on said light shielding plate B as shown in FIG. 2A, and on them hoods $H_1$ and $H_2$ are mounted to form an angle of $\theta$ with each other. Accordingly, with the function of these hoods $H_1$ and $H_2$, the object light $L_o$ enters only on the photo-receiver $P_1$, and the reference light $L_r$ enters only on the photo-receiver $P_2$, and since the photo-receivers $P_1$ and $P_2$ are provided side by side, the object light and the reference light entering on substantially the same portion on the photo-sensitive paper S are measured simultaneously by these two photo-receivers. As for the elements for these photo-receivers, a photo-conductive material such as CdS, CdSe or a photocell such as Se, Si is used, but Si photocell is most appropriate because it has a high sensitivity and a quick response.

Figure 2B:
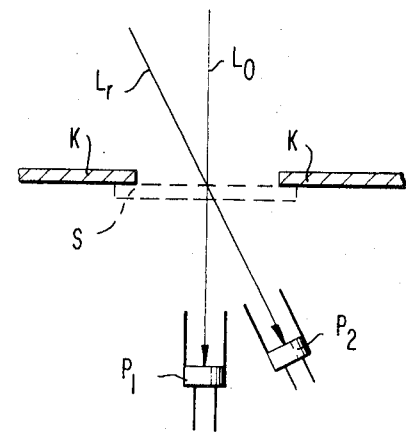
FIG. 2B is a partial view of another embodiment to that shown in FIG. 2A.

The photo-receiver shown in FIG. 2A is so adapted that the photo-sensitive material S is removed at the time of light measurement, but it may be arranged rearward as shown in FIG. 2B, whereby the measurement can be carried out entirely the same as in the case shown in FIG. 2A. In this case, however, by disposing it sufficiently backward, it is also possible to project only the reference light on one of the photo-receivers and only the object light on the other photo-receiver. In this case, the opening K of the portion where the photo-sensitive material is mounted serves as a hood, so that it is possible also to omit the hoods $H_1$, $H_2$ of the photo-receivers. In the holography, there are two kinds of light exposures given on the photo-sensitive material — the object light and the reference light, and a characteristic feature is that these lights makes a certain angle therebetween. It is an object of the present invention to make it possible to measure these light fluxes separately.

Figure 3:
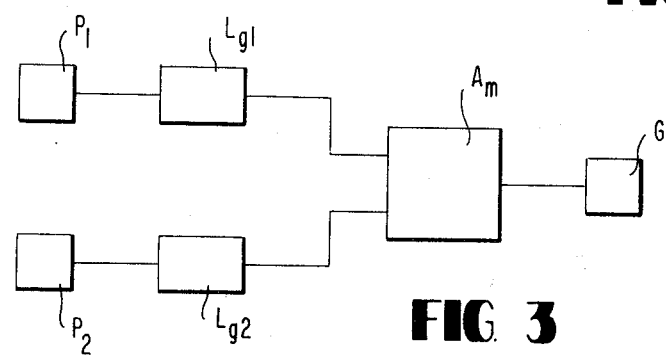
FIG. 3 is a block diagram of the circuit of the apparatus according to the present invention.

FIG. 3 is a block diagram of a circuit to be connected to the light measuring device according to the present invention. The outputs from the photo-receivers $P_1$ and $P_2$ are introduced to logarithmic converting circuits $L_{g1}$, $L_{g2}$ and are converted logarithmically, and after which passed to a calculating circuit Am and is indicated in the meter G as an intensity ratio. When the intensity ratio between this object light and the reference light is not found in a range between 1 : 2 to 1 : 7, or the case in which it does not take a specified value, the light quantity adjusting member N shown in FIG. 1 is moved, whereby the intensity of the reference light is varied so that the adjustment of the intensity ratio is effected. The movement of the light-quantity adjusting member N for adjusting the intensity ratio may be carried out mannually so as to change the indication of the meter G, or it may also be constituted so that the set value is adjusted automatically by using an appropriate automatic equilibrium circuit. The exposure is determined by the sum of the outputs of the photo-receivers $P_1$ and $P_2$, so that it can be calculated by the calculating circuit Am which may be indicated by a similar meter, or memorizing it by an appropriate memory circuit and cause it to control the opening and closing the shutter $S_h$. Since the measurement of the intensity ratio and the quantity of exposure are expressed by the ratio between and the sum of the object light $L_o$ and the reference light $L_r$, respectively, it is possible to measure them simultaneously It is to be noted that during the light measurement, the photo-sensitive material S is removed from the light path or shielded by said light shielding plate B.

After the intensity ratio between the object light and the reference light and the quantity of exposure has thus been determined, since the light measuring device having the photo-receivers $P_1$ and $P_2$ is mounted slidably or swingably directly in front of the photosensitive material S, it is removed from the light path, and the exposure for the photo-sensitive material S is effected by the shutter $S_h$.

FIG. 4 shows another example of the light measuring device comprising a photo-receiver having a hood shown in FIG. 2. The device is disposed directly in front of the photo-sensitive material $S_1$. A photo-receiver $P_s$ adapted to be removed by the sliding or swinging from the light path has, instead of the hoods $H_1$, $H_2$, two light selecting plates $H_3$ and $H_4$ pivoted swingably. These plates, though not shown in the drawing, are mounted on a similar plate as the light shielding plate B shown in FIG. 2 or on a supporting plate which is properly slidable or swingable, and are so constituted that they can be removed from the paths of the object light $L_o$ and the reference light $L_r$ when necessary by operations externally of the housing A of the device. In the measurement of the intensity ratio, the light selecting plates $H_3$ and $H_4$ assume the position shown by full lines, and the object light $L_o$ alone projects on the photo-receiver $P_3$. Next, the incident-light selecting plates $H_3$ and $H_4$ are caused to swing to the positions shown by dotted lines, and the reference light $L_r$ alone projects on the photo-receiver $P_3$, thus both of the light intensities are measured successively. By taking out these values by a similar circuit as shown in FIG. 3, the intensity ratio and the quantity of exposure can be measured. Or, according to circumstances, by holding the incident-light selecting plate $H_4$ at the position shown by a dotted line, and by swinging the incident-light selecting plate $H_3$ alone up to the position shown by the right-hand dotted line, both the object light $L_o$ and the reference light $L_r$ project simultaneously on the photo-receiver $P_3$, so that the quantity of exposure can be measured. In the embodimental example shown in FIG. 2 too, it can easily be understood that, by using one photo-receiver and one hood respectively, and mounting them swingably on the light shielding plate B, it is also possible to measure the object light and reference light successively as in the case of the embodiment shown in FIG. 4. FIG. 5 shows another example of light measuring device, in which two photo-receivers $P_4$ and $P_5$ are arranged directly in front of the photo-sensitive material, and a lens $H_5$ which is the incident-light selecting member is arranged in front of these photo-receivers. As the function thereof is entirely the same as the embodimental example shown in FIG. 2, the detailed explanation thereof is omitted, but if necessary, hoods similar to FIG. 2 may be provided immediately in front of each of the photo-receivers.

FIG. 6 shows another embodiment of the light measuring device according to the present invention. A prism $H_6$ is provided as the incident light selecting member, and the photo-receivers $P_6$ and $P_7$ are arranged close to the two planes. In this case, the object light $L_o$ is wholly reflected at the plane $f$ of the prism $H_6$ and projects on the photo-receiver $P_6$, while the reference light $L_r$, which has an inclined angle $\theta$ with respect to the object $L_o$, passes substantially through the plane and project on the photo-receiver $P_7$, so that the object light $L_o$ and the reference light $L_r$ are measured by the photo-receivers $P_6$ and $P_7$ selectively through the prism $H_6$, and the intensity ratio and the quantity of exposure can be measured as in the embodimental example shown in FIG. 2.

FIG. 7 shows another example of the light measuring device, according to the present invention, in which the Brewster angle of the dielectric is utilized as the incident-light selecting means. That is, a dielectric $H_7$ having an appropriate refractive index is arranged so that, for example, the incident angle 4 of the object light becomes the Brewster angle at a position directly in front of the photo-sensitive material similar to the previous examples, and in the path of the reflected light, there is provided a photo-receiver $P_8$ having a polaroid filter $H_8$ at the front side thereof which is conjugate with the surface of the photo-sensitive material. When the object light $L_o$ is a natural light, the surface reflecting light of the dielectric $H_7$ is only a normal polarized component alone, so that the object light $L_o$ projecting on the photo-receiver $P_8$ can be selected by controlling the rotary surface of the polaroid filter $H_8$.

Since the reference light $L_r$ is not polarized, it is possible to obtain, according to the rotation of the polaroid filter $H_8$, two states in which one is that the object light $L_o$ and the reference light $L_r$ enter simultaneously, and the other is that the reference light $L_r$ only enters in the photo-receiver $P_8$. By taking the difference of these values, the intensity of the object light $L_o$ is obtained, so that the measurements of intensity ratio and the quantity of exposure can be effected.

FIG. 8 shows another embodiment of the light measuring device according to the present invention, and in this case, a polaroid filter $H_9$ is rotatably inserted in the light path of the reference light $L_r$, and a photo-receiver $P_9$ having a similar polaroid filter $H_{10}$ is arranged immediately in front of the surface of the photo-sensitive material. According to the combination of two polaroid filters, which are the incident light selecting members, two states are obtained on the photo-receiver $P_9$, in which one is the object light $L_o$ alone, and the other both lights simultaneously. Thus the measurements of the intensity ratio and the quantity of exposure can be carried out entirely the same as in the embodiment shown in FIG. 7. Of course, it is necessary to use a light source, for the embodiments of FIGS. 7 and 8, which is free from polarized light.

FIGS. 9 and 10 show another embodiment of the light measuring device according to the present invention, wherein a translucent mirror $H_{11}$ or $H_{12}$ is disposed as the incident-light selecting means in the light paths of the object light $L_o$ and the reference light $L_r$ immediately in front of the photo-sensitive material. In FIG. 9, photo-receivers $P_{10}$ and $P_{11}$ are arranged at a position conjugate to the surface of the photo-sensitive material, while in FIG. 10, an ordinary transparent parallel plane glass plate is used as the translucent mirror $H_{12}$, and the reflected light alone of the reference light $L_r$ is measured by the photo-receiver $P_{12}$, and the object light $L_o$ entering perpendicular to the glass plate is measured by the photo-receiver 13 which has a hood $H_{13}$ near the surface of the photo-sensitive material. In the embodiment shown in FIG. 9, the photo-receivers $P_{10}$ and $P_{11}$ can be disposed at a position independent of the surface of the photo-sensitive material, so that photographing can be effected in the condition as it is. The translucent mirror $H_{11}$ may be mounted swingably as a reflecting mirror on the housing A. Furthermore, the photo-receivers $P_{10}$ and $P_{11}$ are provided with hoods shown in FIG. 2.

As described above, in the present invention, the light measuring device is so constituted that the light from the source is divided into two beams one of which is projected on an object to be photographed to make it an object light beam, while the other of which is projected on the photo-sensitive material as a reference light beam and adapted to record the interference fringe patterns: Photo-receivers are arranged so that they can measure the intensity ratio between the object light beam and the reference light beam or quantity of exposure. A selecting member for incident light causes the object light beam or reference light beam selectively to project on said photo-receivers in the light path in which both the object and the reference light beams exist together. Thus there is a great advantage in that the photo-receivers can measure object light beams and reference light beam equivalent to those which impinge upon substantially the same portion on the surface of the photo-sensitive material; thus a highly accurate light measurement can be effected. Furthermore, by arranging the incident-light selecting member in a light path in which the object light and the reference light are found simultaneously, it is possible to measure the object light and the reference light simultaneously and respectively, thus the measurement of the intensity ratio between two lights and the measurement of the quantity of exposure can be effected at one time, so that it is very convenient for simplification of the light measuring operation as well as the automation of the exposure measurement.

While the invention has been particularly shown and described with reference to the preferred embodiment thereof, it will be understood by those skilled in the art that various changes in form and details may be made therein without departing from the spirit and scope of the invention.

We claim:

1. A hologram photographing apparatus comprising:
   a coherent light source,
   first optical means for forming an object light beam by dividing light from the source and projecting it on an object to be photographed,
   second optical means for forming a reference light beam from said divided light,
   a photo-sensitive material arranged for recording interference fringe patterns formed by said object light beam and said reference light beam,
   first and second photo-receiver means arranged for enabling the measurement of the effective intensity ratio between said object light beam and said reference light beam at, and the measurement of the effective quantity of light exposure of, said photo-sensitive material, and
   an incident-light selecting member arranged in the light path wherein both said object light beam and said reference light beam exist together at a position optically equivalent to the surface of said photosensitive material, said incident-light selecting member causing said object light beam and said reference light beam to project separately and respectively on said photo-receiver means, whereby said measurements can be effected.

2. Hologram photographing apparatus as claimed in claim 1, wherein said incident light selecting member and said photo-receivers are arranged on the surface of said photo-sensitive material.

3. Hologram photographing apparatus as claimed in claim 1, wherein said second optical means comprises a light quantity adjusting member for adjusting the intensity ratio between said object light beam and said reference light beam.

4. Hologram photographing apparatus as claimed in claim 2, wherein said incident light selecting member and said photo-receiver means are removable from said photo-sensitive material.

5. Hologram photographing apparatus as claimed in claim 1, wherein said incident-light selecting member comprises mechanical means for selectively projecting said object light beam and said reference light on said photo-receiver means.

6. Hologram photographing apparatus as claimed in claim 1, wherein said incident-light selecting member comprises third optical means for projecting said object light beam or said reference light beam.

* * * * *